United States Patent
Brie

(10) Patent No.: US 9,424,051 B2
(45) Date of Patent: Aug. 23, 2016

(54) METHOD AND SYSTEM FOR MODELING AND NAMING A SOFTWARE CLASS

(76) Inventor: Serge Brie, Quebec City (CA)

(*) Notice: Subject to any disclaimer, the term of this patent is extended or adjusted under 35 U.S.C. 154(b) by 1463 days.

(21) Appl. No.: 12/089,281

(22) PCT Filed: Oct. 13, 2006

(86) PCT No.: PCT/CA2006/001695
§ 371 (c)(1),
(2), (4) Date: Apr. 4, 2008

(87) PCT Pub. No.: WO2007/041867
PCT Pub. Date: Apr. 19, 2007

(65) Prior Publication Data
US 2008/0270975 A1    Oct. 30, 2008

Related U.S. Application Data

(60) Provisional application No. 60/725,658, filed on Oct. 13, 2005.

(51) Int. Cl.
*G06F 9/44* (2006.01)
(52) U.S. Cl.
CPC .................................. *G06F 9/4433* (2013.01)
(58) Field of Classification Search
None
See application file for complete search history.

(56) References Cited

U.S. PATENT DOCUMENTS

| | | | |
|---|---|---|---|
| 5,418,964 A * | 5/1995 | Conner et al. | 719/316 |
| 5,519,868 A | 5/1996 | Allen et al. | |
| 5,615,112 A | 3/1997 | Sheng et al. | |
| 6,023,578 A * | 2/2000 | Birsan et al. | 717/105 |
| 6,381,743 B1 * | 4/2002 | Mutschler, III | 717/104 |
| 6,678,882 B1 * | 1/2004 | Hurley et al. | 717/121 |
| 6,684,388 B1 * | 1/2004 | Gupta et al. | 717/136 |
| 6,742,175 B1 * | 5/2004 | Brassard | 717/107 |
| 6,895,586 B1 * | 5/2005 | Brasher et al. | 719/313 |
| 6,901,579 B1 | 5/2005 | Suguta | |
| 7,165,239 B2 * | 1/2007 | Hejlsberg et al. | 717/114 |
| 7,219,328 B2 * | 5/2007 | Schloegel et al. | 717/104 |
| 2003/0204517 A1 * | 10/2003 | Skinner et al. | 707/100 |
| 2004/0015833 A1 * | 1/2004 | Dellarocas et al. | 717/106 |
| 2004/0044990 A1 * | 3/2004 | Schloegel et al. | 717/113 |

(Continued)

FOREIGN PATENT DOCUMENTS

WO    WO 00/43871 A1    7/2000

OTHER PUBLICATIONS

Epstein, Pete, et al., "Towards a UML Based Approach to Role Engineering", RBAC '99, Fairfax, VA, Oct. 1999, pp. 135-143.*
PCT/Notification of transmittal of the International Search Report (ISR) and the Written Opinion of the International Searching Authority,or the Declaration—PCT/CA2006/001695 (Form PCT/ISA/220)—Jan. 19, 2007—3 pages.

(Continued)

*Primary Examiner* — Evral E Bodden
(74) *Attorney, Agent, or Firm* — Benoît & Côté Inc.

(57) ABSTRACT

A method for modeling classes to create an application in an object-oriented programming environment based on a hierarchical rooted classification (E) and inheritance-based naming of an entity is disclosed. The method comprises in the logic classification (EB), on a first level, determining whether the entity belongs to a single-element class (EBU) or a multiple-element class (EBG) and providing a first indication therefor; on a second level, if the entity belongs to a single-element class (EBU), determining whether the entity is one of a data (I), a link (L), a role (R) and a domain (D) and providing a second indication therefor; and creating a name for the entity by aggregating the first and the second indications.

36 Claims, 16 Drawing Sheets

(56) References Cited

U.S. PATENT DOCUMENTS

| | | |
|---|---|---|
| 2005/0015775 A1* | 1/2005 | Russell et al. ............... 719/315 |
| 2005/0034107 A1* | 2/2005 | Kendall et al. ............... 717/136 |
| 2005/0060695 A1 | 3/2005 | Hostetter et al. |
| 2005/0066338 A1 | 3/2005 | Bloesch et al. |
| 2005/0149906 A1 | 7/2005 | Okrongli |
| 2006/0136482 A1* | 6/2006 | Conn et al. .................. 707/102 |

OTHER PUBLICATIONS

PCT/International Search Report (ISR)—PCT/CA2006/001695 (Form PCT/ISA/210)—Jan. 19, 2007—4 pages.

* cited by examiner

METHOD AND SYSTEM FOR MODELING AND NAMING A SOFTWARE CLASS

FIELD OF THE INVENTION

The invention relates to the field of programming languages and computer management of logical entities such as objects/classes.

BACKGROUND OF THE INVENTION

There exists a need for a comprehensive tool allowing to represent, as close as possible, reality and logic in classes.

With prior art systems, the organization of an object-oriented architecture is highly dependent upon the programmers expertise level. With currently available tools, it is difficult to create objects/classes of a chosen domain. Furthermore, none of the currently available classification systems allow structured creation and naming of all the classes necessary to a given application.

Other difficulties associated with currently available systems include: the difficulty in uniquely naming classes since existing software does not provide any nomenclature rules that makes it easy for a programmer not familiar with the architecture of a system to follow. As a system is being developed and grows in complexity, it becomes harder to maintain a certain consistency in naming of different classes.

Another drawback associated with prior art systems is the difficulty in separately representing a class and its activities. It is common practice therefore to create different classes to represent the same reality, e.g. client, supplier, etc.

It is also difficult to represent the cardinality of a set of objects/classes, since multiplicity is a property that can only be used to characterize links between classes.

Furthermore, with current tools, classes need to be assembled into packages in order to build an architecture. While some current systems provide tools for class creation, these are poorly adapted to describe logical associations between classes.

There are further difficulties in defining packages expressing a dynamic view of an application by associating different classes expressed in a static view.

There are also difficulties in coherently naming packages, as well as certain components such as interfaces and databases.

There are therefore numerous difficulties in imparting knowledge regarding the classes and their associations to other programmers.

SUMMARY

The modeling method according to an embodiment of the present invention comprises a hierarchical rooted classification method including a method of naming classes according to inheritance principles.

A generated model classification class (EM) represents the concept of a model. Within the model classification hierarchy, a model/package-group class (EM_GpEB) represents a logical class assembly model, built around a logic classification class (EB), for implementation in package-group class (EBGp). Furthermore, in an example, model/package-group classes for single-element classes (EBU) and multiple-element classes (EBG) are provided within the hierarchy.

Within a generated logic classification class (EB) hierarchy, both single-element classes (EBU) and multiple-element classes (EBG) can be organized into logic families.

The families of single-element class (EBU) include domain class (EBUD), link class (EBUL), role class (EBUR) and data class (EBUI). The families of multiple-element class (EBG) include associative-group class (EBGa), inheritance-group class (EBGh), family-group class (EBGf) and package-group class (EBGp).

Furthermore, the exemplary concepts represented by the above classes facilitate their logical associations in order to represent better and separately any class and its behaviour The naming method according to an embodiment of the present invention facilitates the maintenance of a coherent "name space" since it allows the creation of class names providing information regarding the logic family to which a class belongs, as well as references to other classes.

The modeling method according to an embodiment of the present invention further comprises, in another aspect, a method for associating classes into class assembly models according to exemplarily concepts such as role, group and transaction. Such class assembly models are implemented in model/package-group classes (EM_GpEB). In still another aspect, the inherent logic of the classification, the naming method and class assembly method according to an embodiment the present invention, further facilitate pseudo code creation.

In order to achieve a logical and coherent approach for class creation within an application, an embodiment of the present invention allows creation and naming of each class within a hierarchical rooted classification including classes representing a logical assembly of classes such as class assembly models and packages.

According to an embodiment, there is provided a method for modeling classes to create an application in an object-oriented programming environment based on a hierarchical rooted classification (E) and inheritance-based naming of an entity. The method comprising, in the logic classification (EB), on a first level, determining whether the entity belongs to a single-element class (EBU) or a multiple-element class (EBG) and providing a first indication therefor; on a second level, if the entity belongs to a single-element class (EBU), determining whether the entity is one of a data (I), a link (L), a role (R) and a domain (D) and providing a second indication therefor; and creating a name for the entity by aggregating the first and the second indications.

According to another embodiment, the method for modeling classes further comprises if said entity represents a multiple-element class (EBG), determining whether said multiple-element class is one of: a family group (f) in which all elements are implemented objects from classes descendant from the same hierarchical class; an inheritance group (h) in which all elements are implemented objects from the same class; an associative group (a), in which elements belong to different classes; and a package group (p) in which elements are part of a logical class assembly.

According to another embodiment, there is provided a method for creating pseudo-code comprising: creating classes according to the method for modeling classes as disclosed above; creating a class assembly model for each model/package-group class; assembling said classes into package-group classes according to said model/package-group classes; and creating pseudo-code from said classes.

According to another embodiment, there is provided a computer implemented method for creating an application from model classes, the application for use in an object-oriented programming environment and based on a hierarchical rooted classification (E) and inheritance-based naming of an entity, the method comprising: in a logic classification (EB), on a first level, determining whether the entity belongs to a single-element class (EBU) or a multiple-element class (EBG) and providing a first indication therefor; on a second level, if the entity belongs to a single-element class (EBU), determining whether the entity is one of a data (I), a link (L), a role (R) and a domain (D) and providing a second indication therefor; creating a name for the entity by aggregating the first and the second indications; and using the name and the classes to create the application for execution by a data-processing system.

According to another embodiment, there is provided a data-processing system for creating an application comprising: a processing unit; a memory unit for communication with the processing unit, the memory unit comprising a program, the program for adapting the computer system to perform the following steps: in a logic classification (EB), on a first level, determining whether the entity belongs to a single-element class (EBU) or a multiple-element class (EBG) and providing a first indication therefor; on a second level, if the entity belongs to a single-element class (EBU), determining whether the entity is one of a data (I), a link (L), a role (R) and a domain (D) and providing a second indication therefor; creating a name for the entity by aggregating the first and the second indications; using the name and the classes to create the application; and storing the application in the memory unit for execution by the processing unit.

According to another embodiment, there is provided a computer readable medium having recorded thereon statements and instructions for execution by a data-processing system to carry out a computer-implemented method for creating an application from model classes, the method comprising: in a logic classification (EB), on a first level, determining whether the entity belongs to a single-element class (EBU) or a multiple-element class (EBG) and providing a first indication therefor; on a second level, if the entity belongs to a single-element class (EBU), determining whether the entity is one of a data (I), a link (L), a role (R) and a domain (D) and providing a second indication therefor; creating a name for the entity by aggregating the first and the second indications; and using the name and the classes to create the application.

BRIEF DESCRIPTION OF THE DRAWINGS

These and other features, aspects and advantages of the present invention will become better understood with regard to the following description and accompanying drawings wherein.

DETAILED DESCRIPTION

The rooted hierarchic classification method according to an embodiment of the present invention provides a structural base from which all classes necessary to a computer application can be easily declared and classified according to inheritance principles. The classification method further allows for inheritance-based naming of an entity according to its place within the hierarchical classification, as well as with respect to other referenced classes.

Figure 1:
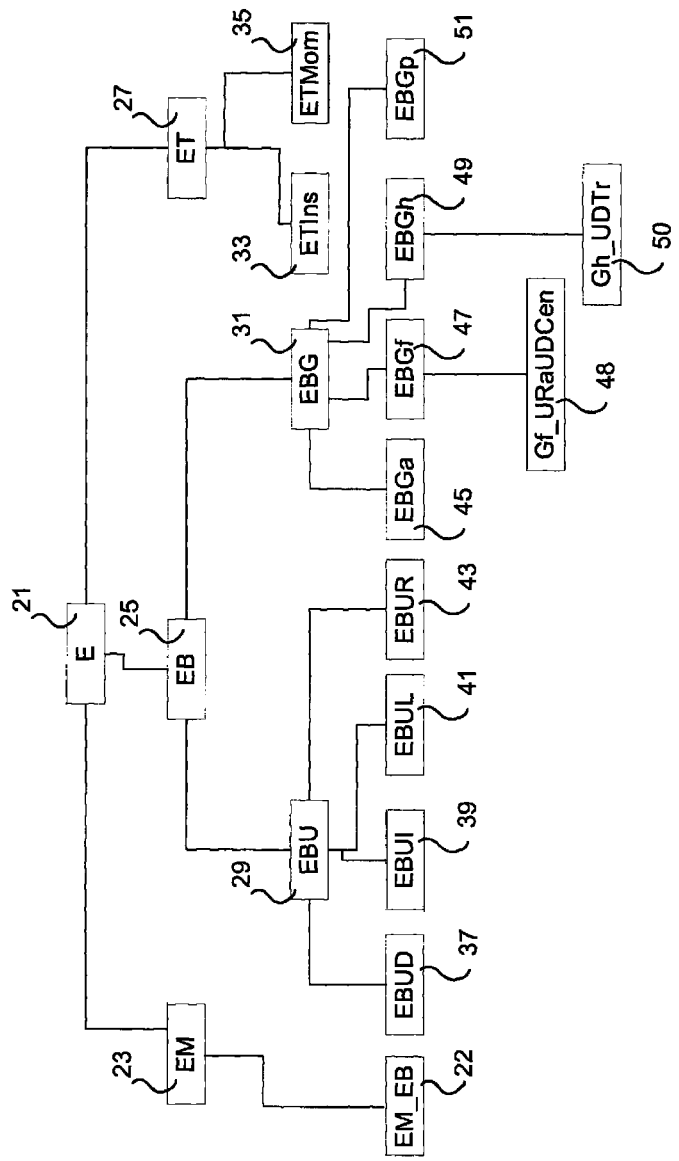
FIG. 1 is a block diagram of a hierarchical structure of classes according to an embodiment of the classification method of the present invention.

With respect to FIG. 1, there is provided a root element class (E) 21 from which all other classes are derived. The hierarchical classification method according to an embodiment of the present invention provides for the possibility of modeling classes according to different logical classifications of entities. For example, all classes (EB) 25 are part of a logic classification. All classes (EM) 23 are part of a model classification, while classes (ET) 27 are time elements, including the final-classes (ETIns) 33 for instants and (ETMom) 35 for moments.

Figure 8:
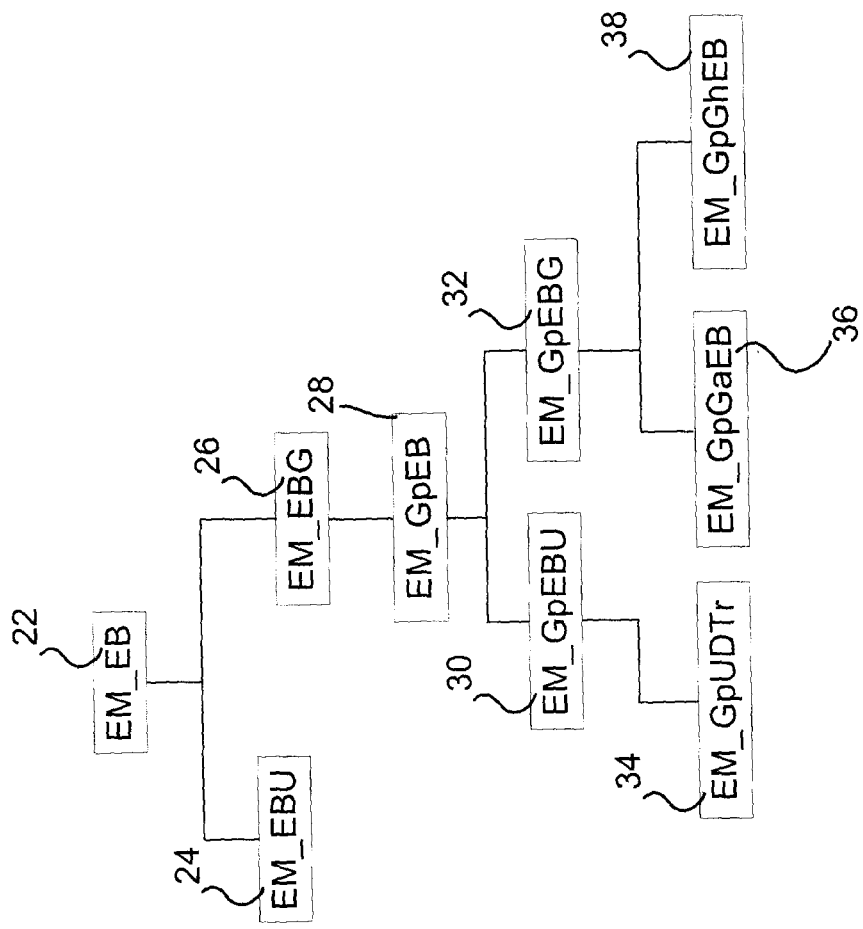
FIG. 8 is block diagram of a hierarchical structure of model classification classes according to an embodiment of the classification method of the present invention.

Within model classification class (EM) 23 hierarchy, generated class (EM_EB) 22 represents the model for implementation of a logic classification class (EB) 25. As shown in FIG. 8, Class (EM_EB) 22 generates model/single-element class (EM_EBU) 24 and model/multiple-element class (EM_EBG) 26. Further generated from model/multiple-element class (EM_EBG) 26 is exemplarily model/package-group class (EM_GpEB) 28 which generates model/package-group/single-element class (EM_GpEBU) 30 and model/package-group/multiple-element class (EM_GpEBG) 32. Still further, exemplarily classes can be classified as model/package-group/transaction class (EM_GpUDTr) 34, model/package-group/associative-group class (EM_Gp-GaEB) 36 and model/package-group/inheritance-group class (EM_GpGhEB) 38.

Returning to FIG. 1, within logic classification class (EB) 25, classes can further be generated according to whether they are single-element class (EBU) 29 or multiple-element class (EBG) 31. A single-element class is a class that may be used to define a single entity. A multiple-element class is a class that may be used to define a composite entity, such as a group of entities.

Still with respect to FIG. 1, at a next level within the hierarchical classification structure, the single-element classes (EBU) 29 may be further classified. For example, a single-element class can generate a domain class (EBUD) 37, which represents a logical, a physical or a virtual element of the domain of activity. The concept of domain is analogous to that of "object" in traditional object-oriented programming. Examples of single-element classes are classes used to describe entities such as: a product, a commercial entity, a transaction, a register, etc.

Single-element class (EBU) 29 can also generate a logical link class (EBUL) 41, which can be used to model a link in a contextual class association, e.g., the relationship between a class and its role, the inheriting relationship between classes or the relationship between a class and the group to which it belongs. Examples of single-element link classes are therefore link role, link inheritance, link group, etc. A link class exposes a contextual class association.

Another type of generated single-element class is a logical role class (EBUR) 43, which is used to represent the role imparted to a given class and serve to dissociate a class from its role; i.e., what a thing is and what it does are represented by different classes. Examples of single-element role classes include activities such as seller and buyer.

Also generated are virtual data classes (EBUI) 39 for representing computer tools. This representation provides, in the model, the data necessary to the computer application; e.g., data, state, function, interface.

Still with respect to FIG. 1, generated multiple-element classes will be described. These include, for example, associative-group class (EBGa) 45 which is for representing assemblies of classes not represented by other multiple-element classes. Another multiple-element class is the family-group class (EBGf) 47 which is a class representing a set of implemented objects from classes originating from a same hierarchical class. In a same class (EBGf) 47, for example, a project management role and a human resources role may be grouped as enterprise roles. Example class (Gf_URaUDCen) 48 is shown and will be further discussed below.

Still another multiple-element class is the inheritance-group class (EBGh) 49 which is a class for representing a set of implemented objects from a same class. For example, a group of all commercial entities or a group of all link roles for project resources are classes (EBGh) 49. Example class (Gh_UDTr) 50 is shown and will be further discussed below.

Yet another multiple-element class is the package-group class (EBGP) 51 which is a class representing the implementation of a class assembly model from a model/package-group class (EM_GpEB) 32.

Now, with respect to FIG. 2, classes corresponding to the families described hereinabove will be described. In the domain class (EBUD) 37, there are provided the following exemplary classes: classification class (UDCI) 53, commercial entity class (UDCen) 55, interval class (UDIa) 57, product class (UDP) 61, register class (UDRe) 59 and transaction class (UDTr) 63.

The product class (UDP) 61 is a parent class to child classes (UDPP) 69 for a physical product and (UDPs) 71 for a service product.

The transaction class (UDTr) 63 plays an important role in representing a class common to two different activity assemblies (such as buying and selling, for example). Indeed, a (UDTr) 63 class allows to link logically different package-group classes implemented in a computer application.

Figure 2:
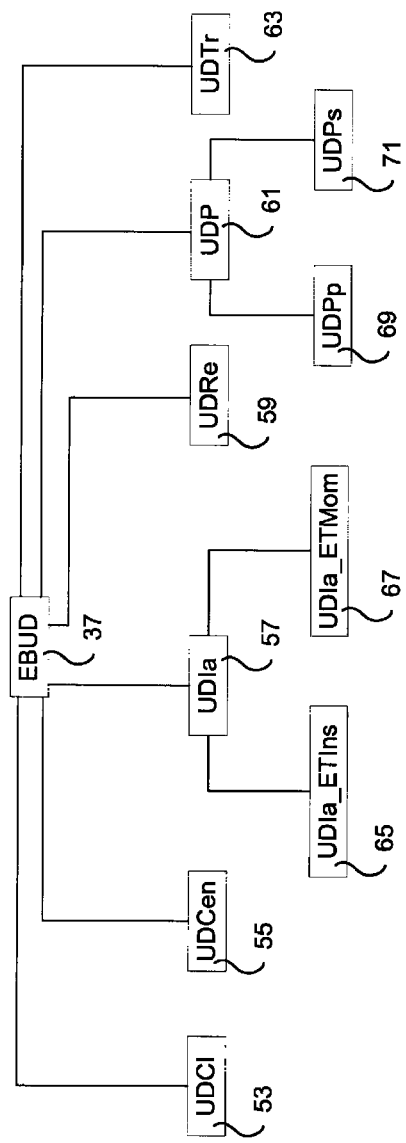
FIG. 2 is a block diagram of a hierarchical structure of single-element domain classes according to an embodiment of the classification method of the present invention.

Finally, as shown in FIG. 2, the interval class (UDIa) 57 is a parent to the instant interval class (UDIa_ETIns) 65 and the moment interval class (UDIa_ETMom) 67.

Figure 3:
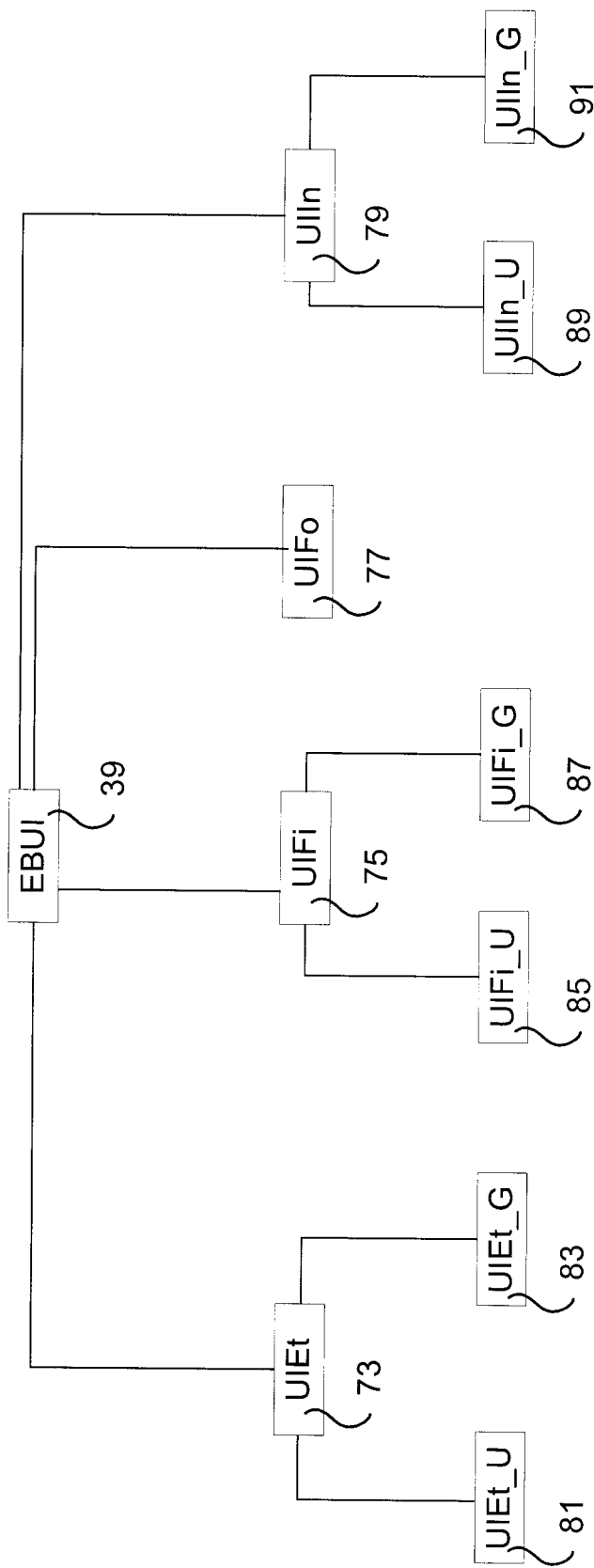
FIG. 3 is a block diagram of a hierarchical structure of single-element data classes according to an embodiment of the classification method of the present invention.

Now, with respect to FIG. 3, exemplary data class (EBUI) 39 will be described. Classes that may be generated within the class (EBUI) 39 hierarchy include: state class (UIEt) 73, file class (UIFi) 75, function class (UIFo) 77 and interface class (UIIn) 79. Some of these classes can be used as building blocks for creating classes including their reference to a single-element class (81, 85 and 89) or a multiple-element class (83, 87 and 91).

Figure 4:
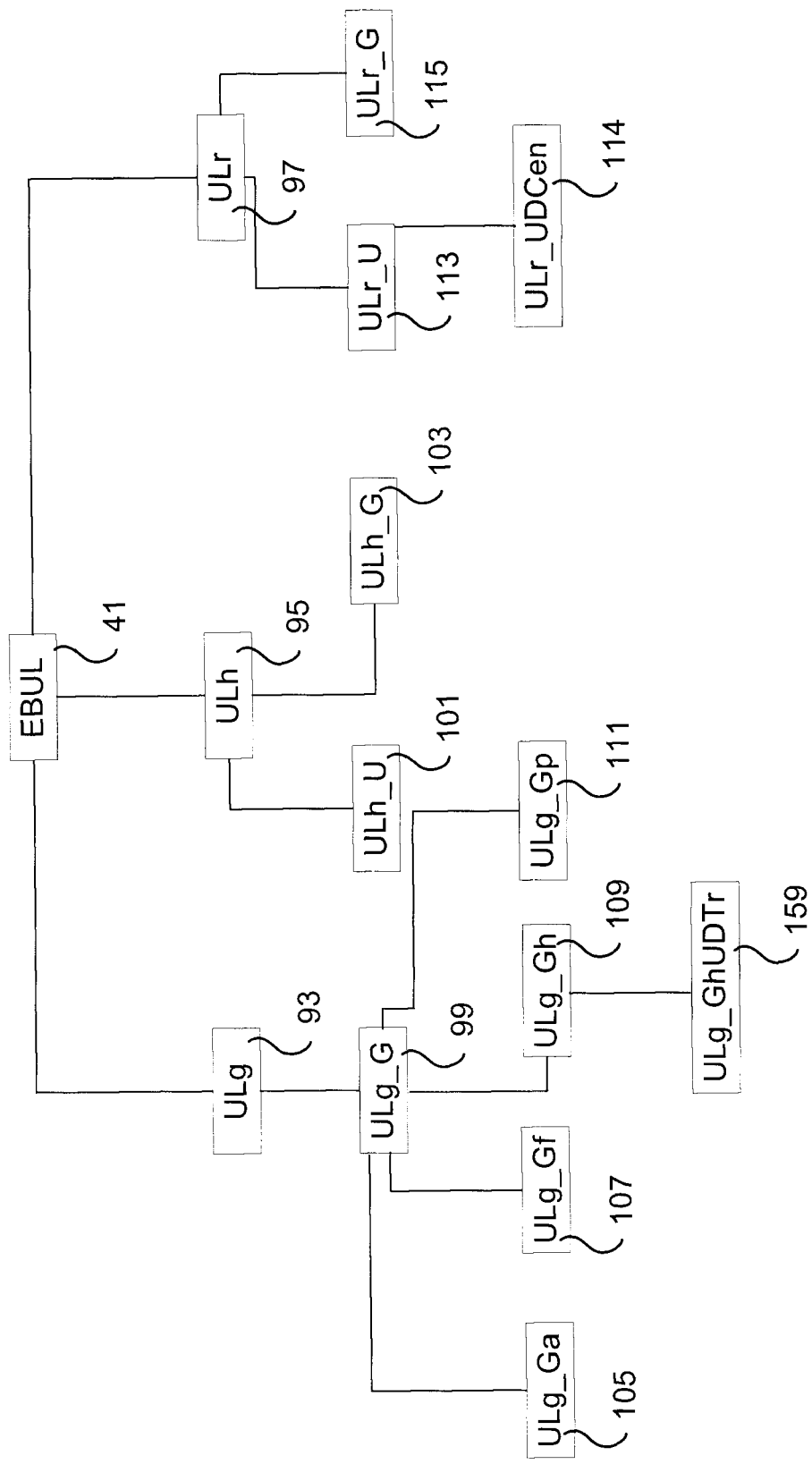
FIG. 4 is a block diagram of a hierarchical structure of single-element link classes according to an embodiment of the classification method of the present invention.

In FIG. 4, there is shown exemplary link class (EBUL) 41, used for representing link classes. Classes of the type link-group class (ULg) 93 are used to build group behavior in class assembly and generate link-group/multiple-element class (ULg_G) 99. Further generated classes may be one of a link-group/associative-group class (ULg_Ga) 105, a link-group/family-group class (ULg_Gf) 107, a link-group/inheritance-group class (ULg_Gh) 109 and a link-group/package-group class (ULg_Gp) 111. Exemplarily, link-group/inheritance-group/transaction class (ULg_GhUDTr) 159 is also generated.

Still, with respect to FIG. 4, classes of the type link-inheritance class (ULh) 95 are used to build inheritance link classes. These might be inheritance links for single-element classes (ULh_U) 101 or multiple-element classes (ULh_G) 103.

Classes of type link-role (ULr) 97 are used to build role behavior in class assembly i.e. to link a class to its role. In fact, a link-role class exposes what a class is as well as which role it plays. Again, as for other class types, these may be links for single-element classes (ULr_U) 113 or multiple-element classes (ULrLG) 115. Example class (ULr_UDCen) 114 is shown and will be further discussed below.

Figure 5:
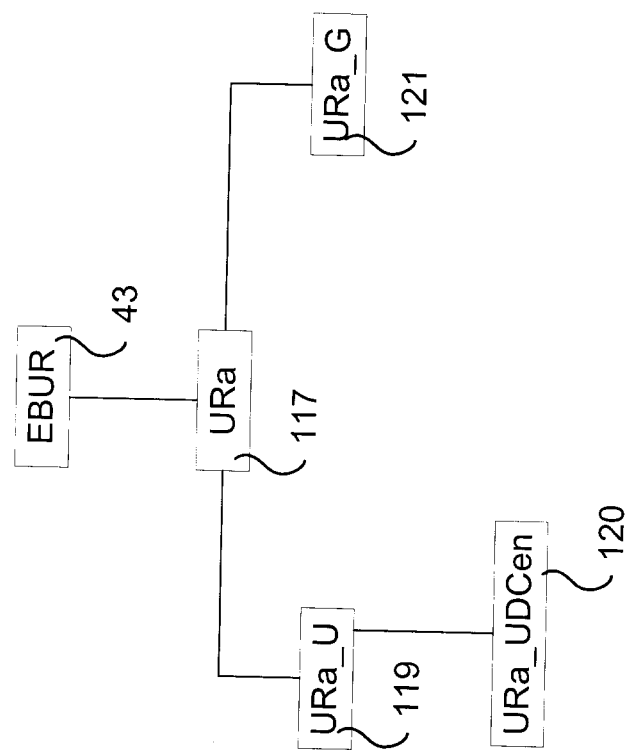
FIG. 5 is a block diagram of a hierarchical structure of single-element role classes according to an embodiment of the classification method of the present invention.

Now, with respect to FIG. 5, there are shown single-element classes used for representing role classes, i.e. of the type role class (EBUR) 43. Exemplarily classes of the type (URa) 117 are used to describe a type of role. Again, as for other class types, generated classes may be defined with reference to single-element classes (URa_U) 119 or multiple-element classes (URa_G) 121. Example class (URa_UDCen) 120 is shown and will be further discussed below.

While not shown in the appended drawings, the multiple-element classes (EBGf) 47 and (EBGh) 49, may each be used for creating a class grouping a plurality of implemented objects from either a single-element class or a multiple-element class, designated with the usual "_U" or "G" notation respectively. Also not shown, the multiple-element classes (EBGa) 45 and (EBGp) 51 may each be used to represent class assemblies for either single-element classes or multiple-element classes, designated with the usual "_U" or "_G" notation, respectively.

As can be seen from the classification method described above, an embodiment of the present invention may be used for implementing a naming method representative of the hierarchical position of a class in the classification, as well as of its reference to another class. In the context of computer application development, the naming method may be used for creating a coherent library of class names for the whole system. The naming method therefore provides a basis from which all entities necessary in an application can be named in a unique manner. The inheritance naming method provides for child classes incorporating the name of the parent classes, as well as the names of other referenced classes.

The syntax of the naming method is based on several principles that include use of one-letter abbreviations to represent upper-level classes, use of two-letter abbreviations for intermediate-level classes, use of three-letter abbreviations for final classes and the use of the underscore character "_" in order to indicate class references.

The aggregation of the letters and characters may be read by separating the elements starting by the letters U or G.

The following are examples of entity names created according to an embodiment of the present invention.

(Gh_UDTr) 50 (see FIG. 1) is a name for a multiple-element inheritance-group class (EBGh) 49 of a set of implemented objects from a single-element domain transaction class (UDTr) 63.

(URa_UDCen) 120 (see FIG. 5) is a name for a single-element role class (URa) 117 used to impart an activity to a single-element domain commercial entity class (UDCen) 55.

(Gf_URaUDCen) 48 (see FIG. 1) is a name for the multiple-element family-group class (EBGf) 47 of a set of implemented objects from classes descendant from a single-element role class (URa) 117 imparted to a single-element domain commercial entity class (UDCen) 55.

(ULr_UDCen) 114 (see FIG. 4) is a name for a single-element link-role class (ULr) 97 used to impart a role to a single-element domain commercial entity (UDCen) 55.

An embodiment of the present invention comprises, in a second aspect, an easy and improved method of associating classes. Exemplarily behaviour concepts such as role, group and transaction are embodied in class assembly construct. Such constructs are implemented in the model/package-group classes required by the application. In effect, behavior for any given class of the classification may then be represented by a logical class assembly model built around that class.

Figure 6:
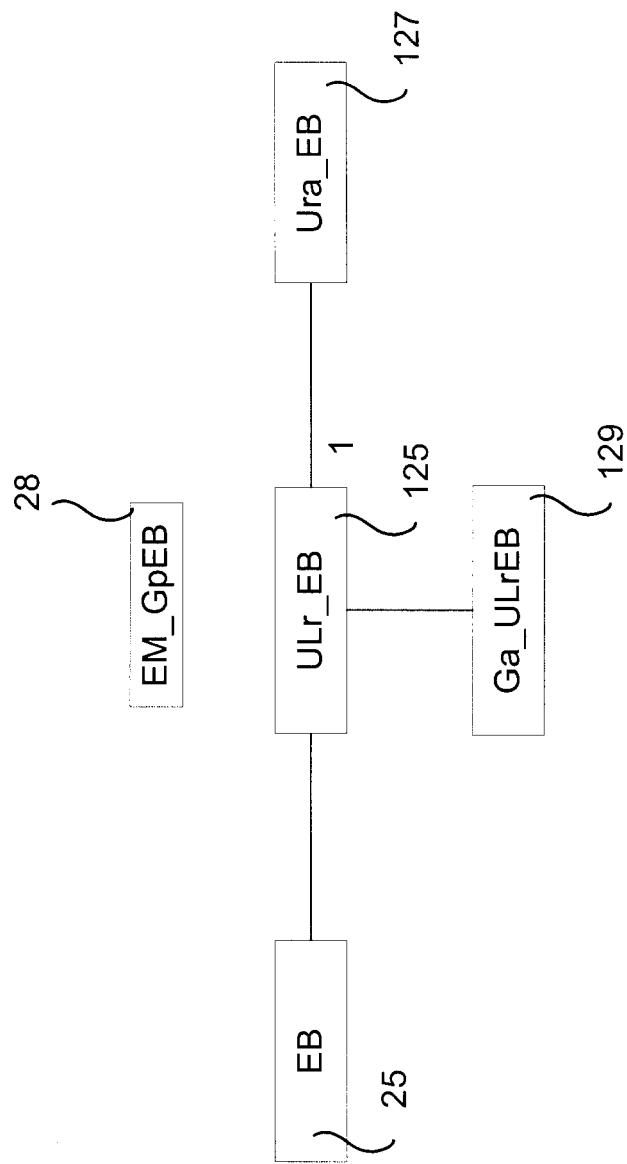
FIG. 6 is a block diagram of a class assembly built around a logic classification class implementing the role concept to a model/package-group class according to an embodiment of the modeling method of the present invention.

With respect to FIG. 6, there is shown an exemplary implementation of the concept of role construct to a model/package-group class (EM_GpEB) 28. Within the class assembly model, class (EB) 25 represents the target class to which the role, represented by role class (URa_EB) 127, is associated. The class (EB) 25 may be a single-element or a multiple-element class. Such a class (EB) 25 is associated to link-role class (ULr_EB) 125. The class (ULr_EB) 125 is the link for a particular role. Finally, the associative-group/link-role class (Ga_ULrEB) 129 is a multiple-element class assembling related classes and providing parameters for the class (EB) 25 and the associated role class (URa_EB) 127.

Figure 7:
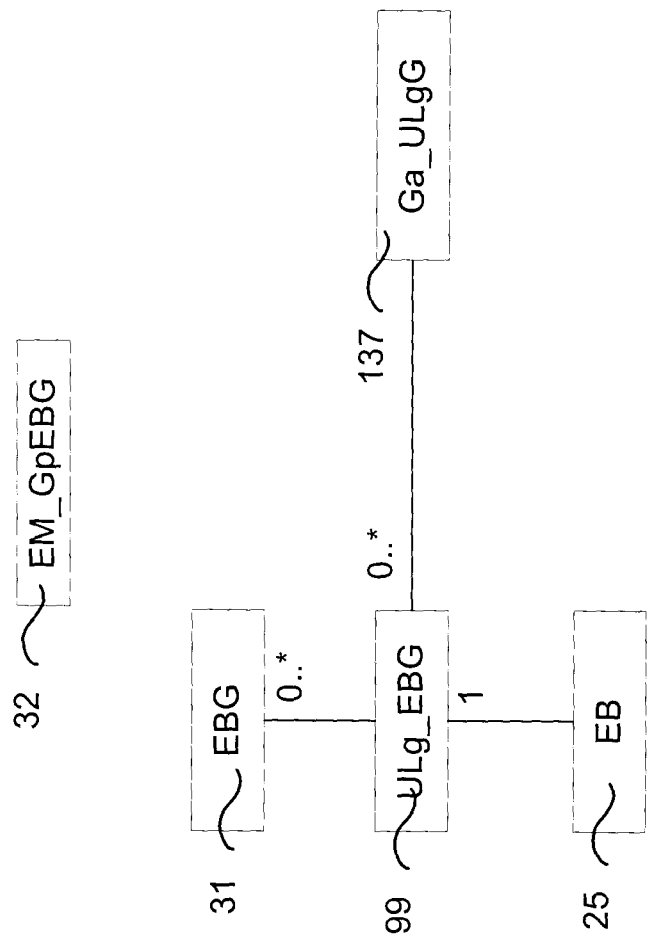
FIG. 7 is a block diagram of a class assembly built around a multiple-element class implementing the group concept to a model/package-group/multiple-element class according to an embodiment of the modeling method of the present invention.

With respect to FIG. 7, there is shown another exemplary implementation of the concept of a group construct to a model/package-group/multiple-element class (EM_GpEBG) 32. Within the class assembly model, class (EBG) 31 represents any type of multiple-element class (i.e., may take on any of the Ga, Gf, Gh or Gp values). Class (ULg_G) 99 represents a link group for associating an object of class (EB) 25 to multiple-element class (EBG) 31. It is useful to stipulate that a class (EBG) 31 may be connected to a plurality of objects of the class (EB) 25, but each link is for a single object of the class (EB) 25 at a time. Finally, the associative-group/link-group/multiple-element class (Ga_ULgG) 137 represents a multiple-element class assembling related classes and providing information specific to the assembly.

Figure 9:
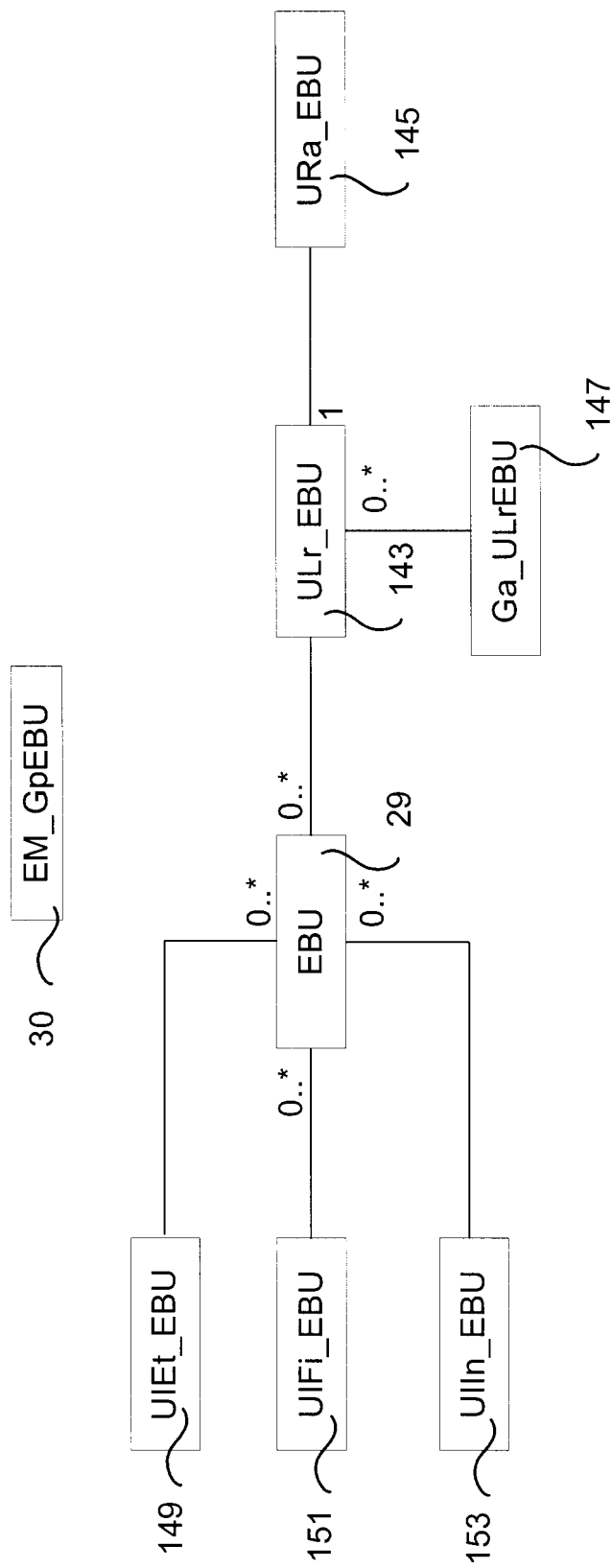
FIG. 9 is a block diagram of a class assembly built around a single-element class implementing the role concept to a model/package-group/single-element class according to an embodiment of the modeling method of the present invention.

FIG. 9 represents an implementation of a class assembly model to a model/package-group/single-element class (EM_GpEBU) 30, based on the class assembly model of FIG. 6. Classes 149, 151 and 153 are data element classes, representing a state class, file class and interface class respectively associated to the single-element class (EBU) 141.

Figure 10:
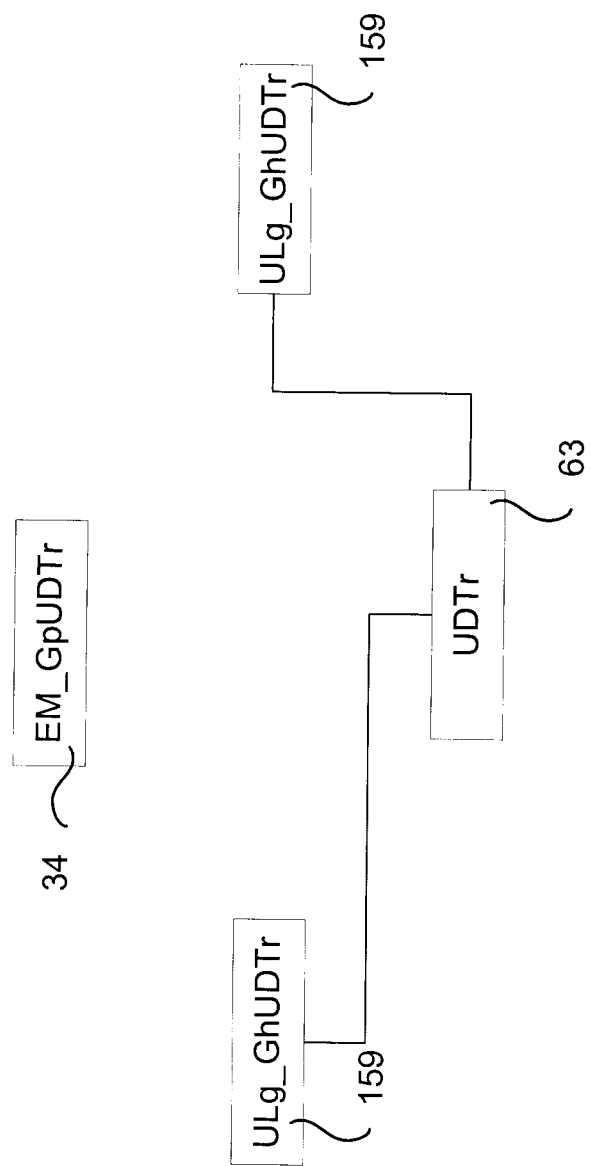
FIG. 10 is a block diagram of a class assembly built around a transaction class implementing the transaction concept to a model/package-group/transaction class according to an embodiment of the modeling method of the present invention.

FIG. 10 represents an implementation of the concept of a transaction construct to a model/package-group/transaction class (EM_GpUDTr) 34. Within the class assembly model, transaction class (UDTr) 155 may belong to a minimum of two link-group/inheritance-group/transactions classes (ULg_GhUDTr) 159 representing logical senders and receivers. In effect, a transaction class (UDTr) 155 permits multiple inheritance-group/transaction classes (Gh_UDTr) 50 ownership; each may be associated in class assembly of different package-group classes.

Figure 11:
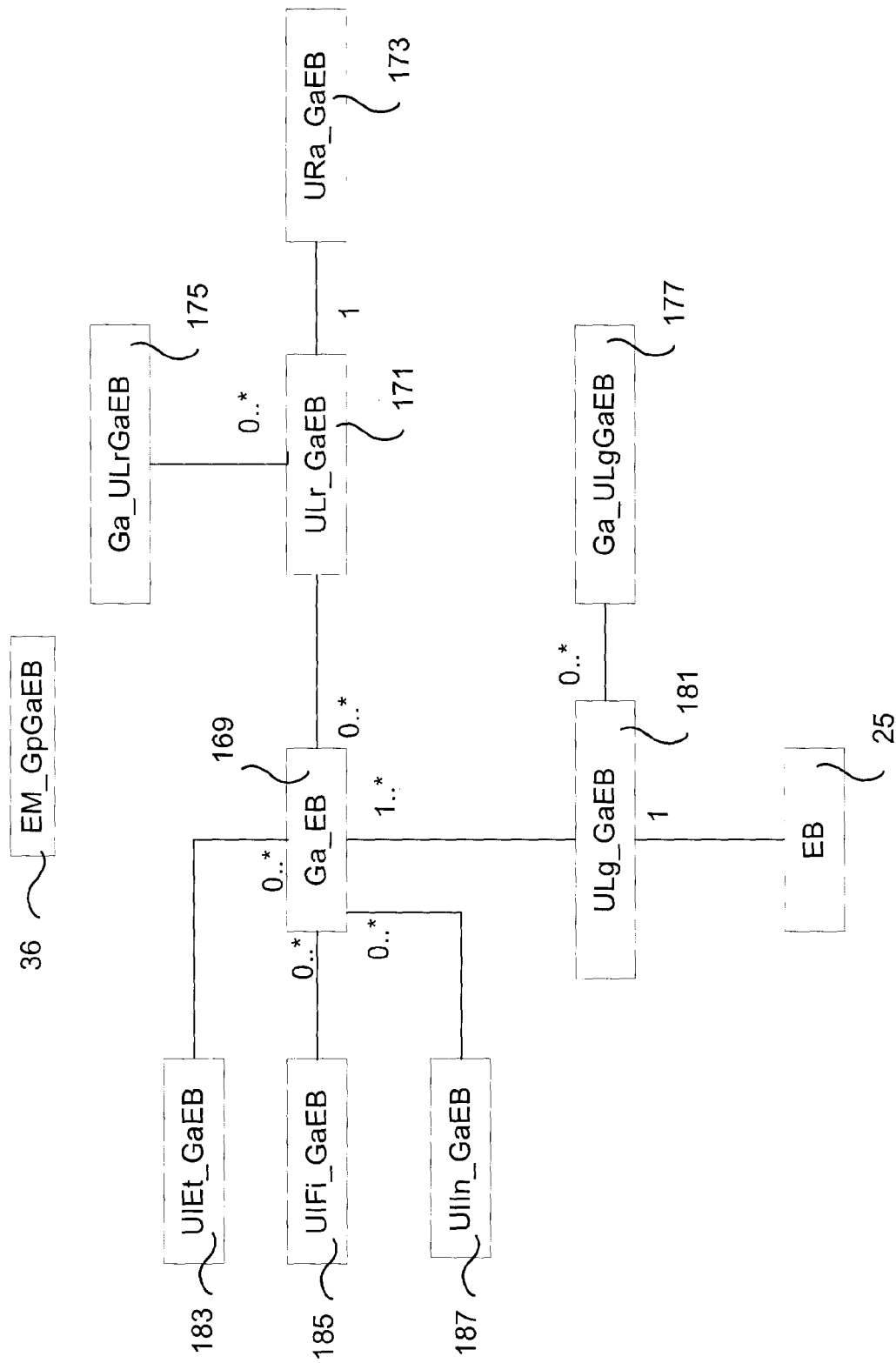
FIG. 11 is a block diagram of a class assembly built around an associative-group class implementing the role and group concept to a model/package-group/associative-group class according to an embodiment of the modeling method of the present invention.

FIG. 11 represents an implementation of a class assembly model to model/package-group/associative-group class (EM_GpGaEB) 36 based on the class assembly model of FIG. 6 and the class assembly model of a multiple-element class of FIG. 7. In FIG. 11, it is useful to stipulate that objects of class (EB) 25 are different from objects of the model and of the objects of class (EB) 25 referenced in associative-group class (Ga_EB) 169. Classes 183, 185 and 187 are data element classes, representing a state class, file class and interface class respectively associated to the associative-group class (Ga_EB) 169.

Figure 12:
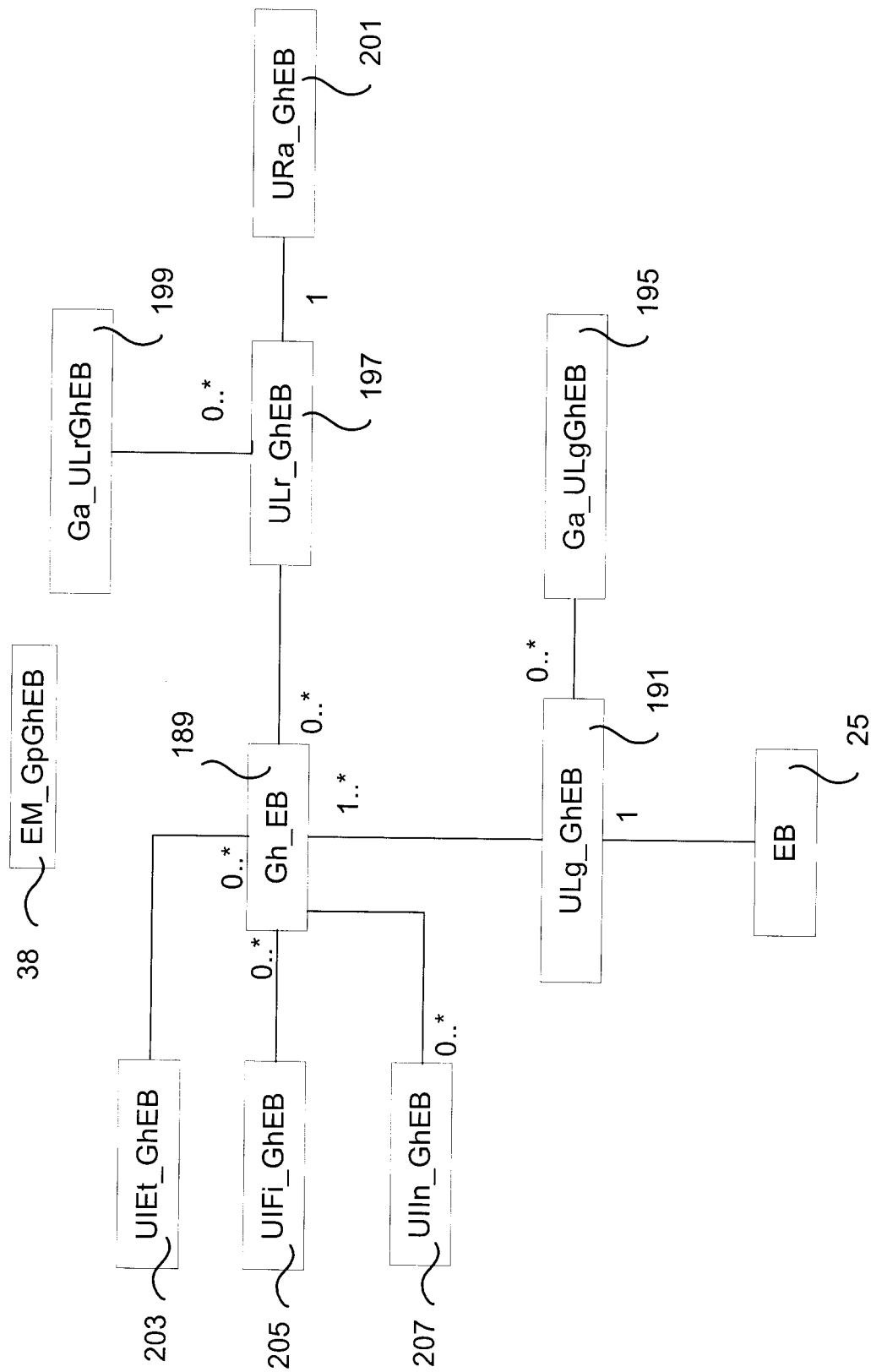
FIG. 12 is a block diagram of a class assembly built around an inheritance-group class implementing the role and group concept to a model/package-group/inheritance-group class according to an embodiment of the modeling method of the present invention.

FIG. 12 represents an implementation of a class assembly model to model/package-group/inheritance-group class (EM_GpGhEB) 38 based on the class assembly model of FIG. 6 and the class assembly model of a multiple-element class of FIG. 7. In FIG. 12, all class (EB) 25 objects are objects from the same parent class.

The implementation according to an embodiment the present invention requires creating the appropriate classes within the classification and using model/package-group classes to assemble them in order to obtain the packages needed in a given computer application. The packages will be represented by a class of the multiple-element package-group class.

Figure 13:
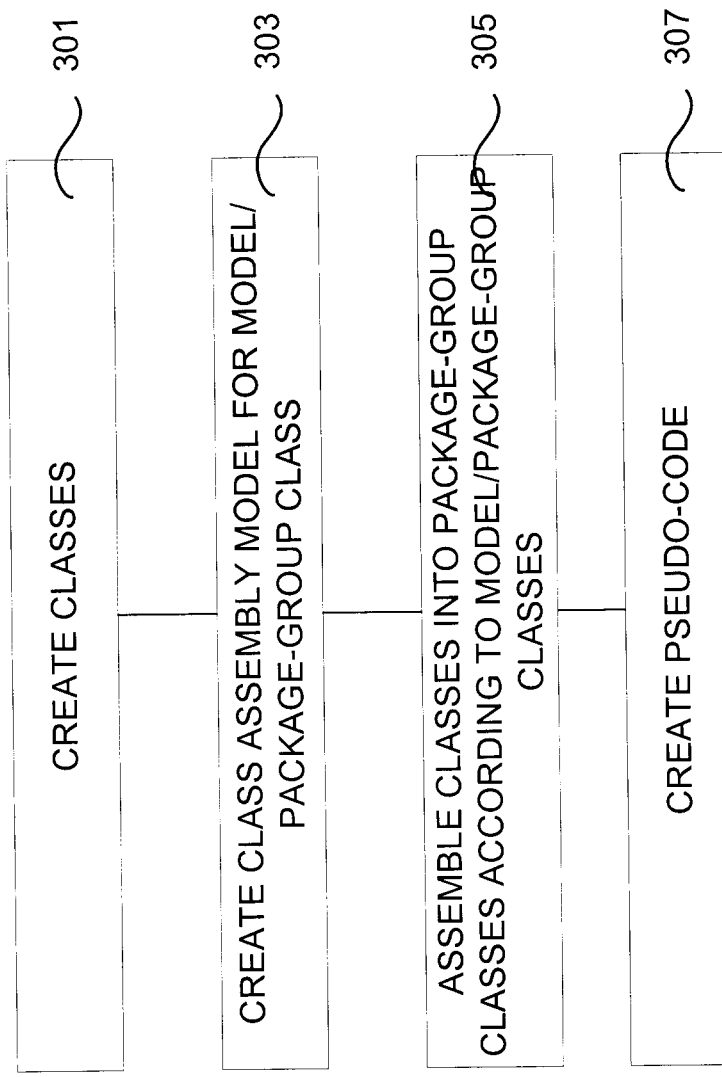
FIG. 13 is a flow chart of a method for code generation according to an embodiment of the present invention.

An embodiment of present invention also provides, as shown in FIG. 13, a method of creating pseudo-code. In step 301, classes are created according to the classification method that has been described hereinabove. In step 303, a class assembly model is created for each model/package-group class. In step 305, model/package-groups are used to assemble classes into package-group class according to model/package-group classes. Finally, in step 307, the pseudo-code is created featuring the advantages of the hierarchical rooted classification, the inheritance-based naming and the logical class assembly methods according to an embodiment of the present invention.

Figure 14:
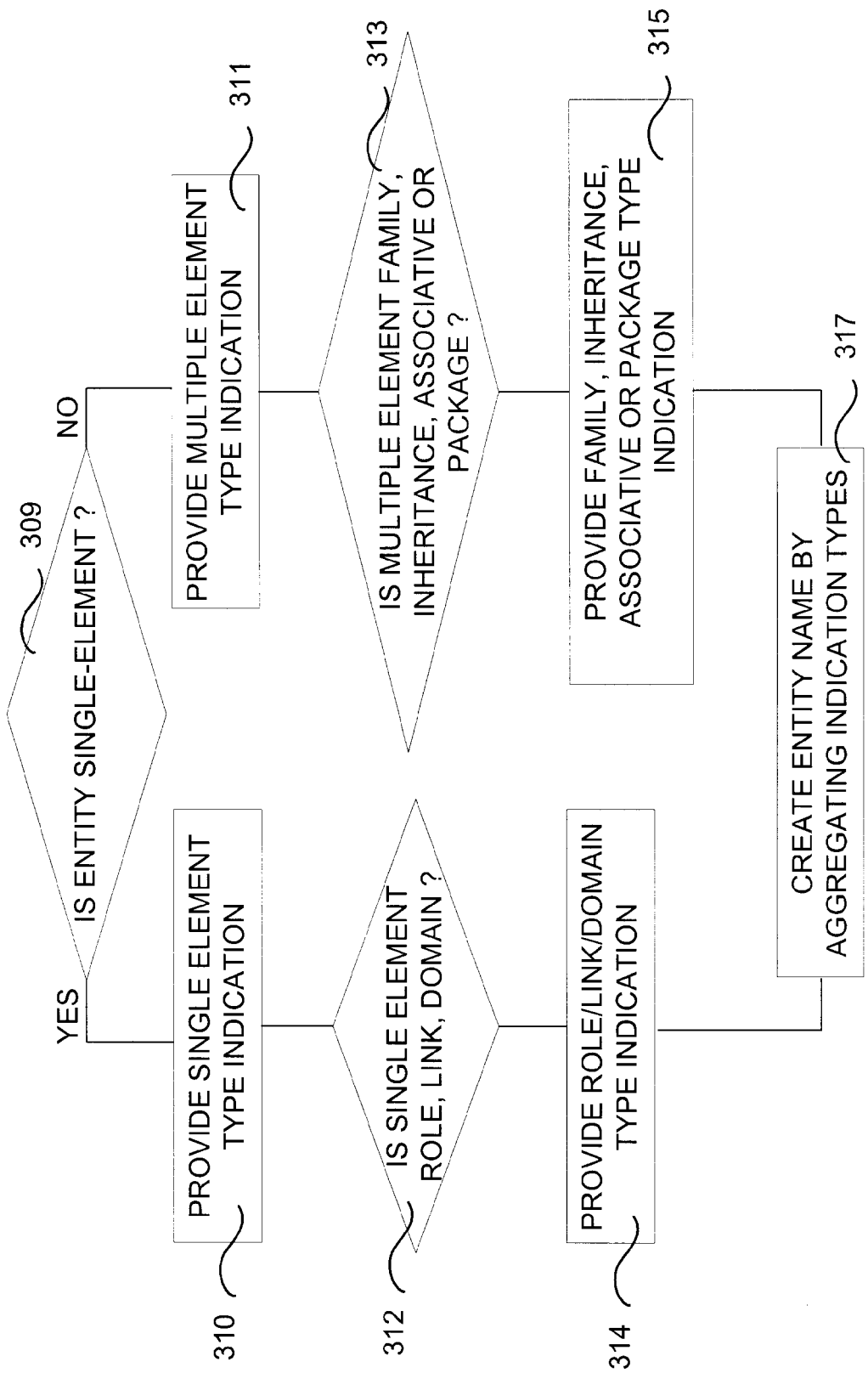
FIG. 14 is a flow chart of a method for hierarchical classification and inheritance-based naming of an entity according to an embodiment of the present invention.

With respect to FIG. 14, there is shown a method for inheritance-based naming of a logic classification entity in an object-oriented environment according to an embodiment of the present invention. In step 309, an evaluation is made as to whether the entity is a single element. If so, in step 310, a single-element type indication is provided. Then, in step 312, an assessment is made as to whether the single element represents a role, a link, a domain or data. In step 314, an indication is provided appropriate to the type (role, link, domain, and data). Finally, in step 317, an entity name is created by aggregating all provided type indications. Similarly, if the entity is a multiple element, a multiple-element type indication is provided in step 311. Then, in step 313, it is determined whether the multiple-element is of the family, inheritance, associative or package type. In step 315, a type indication, such as family, associative, package, etc. is provided. Finally, in step 317, an entity name is created by aggregating the provided type indications.

Figure 15:
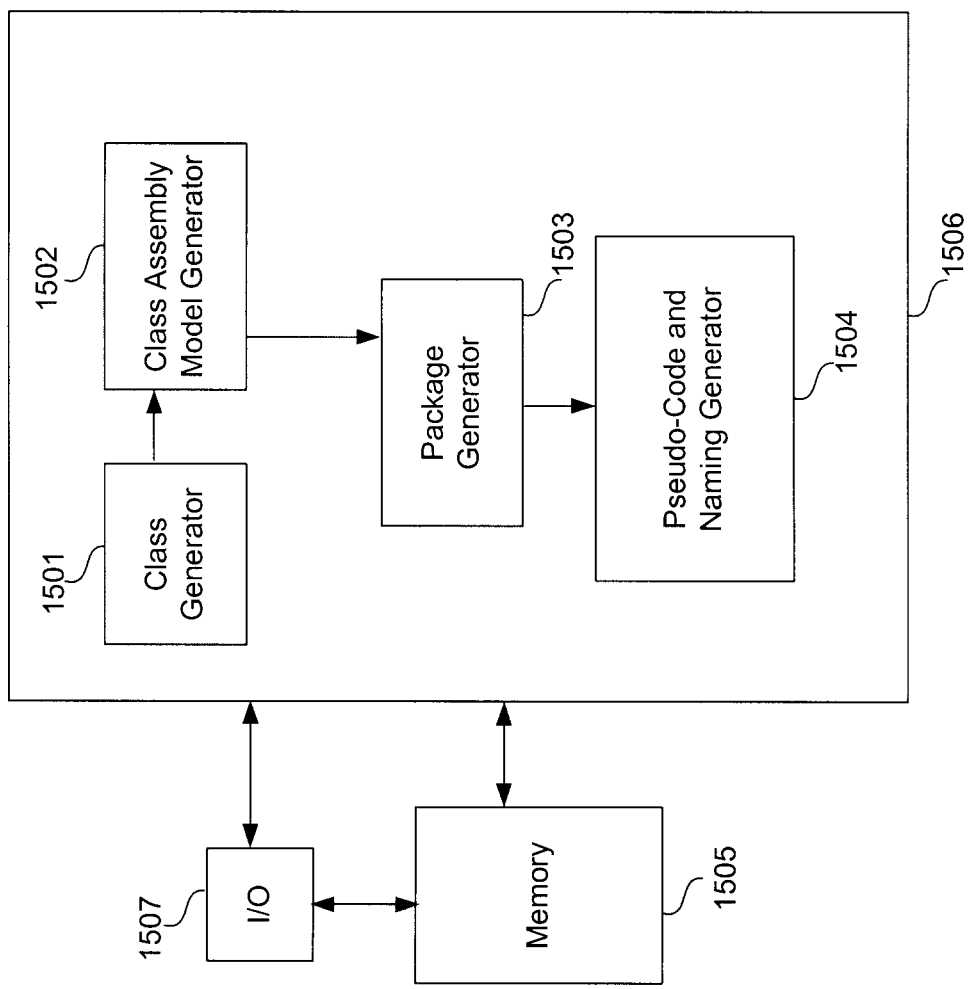
FIG. 15 is a block diagram schematically illustrating functional components of a structured class modeling system according to one embodiment.

FIG. 15 illustrates the functional components of a system 1506 for structured class modeling; a system implementing the above-detailed class assemblies. The system comprises a class generator 1501 for creating classes according to the classification method described hereinabove. A class assembly model generator 1502 creates a class assembly model for each model/package-group classes and a package generator 1503 assembles the classes into package-group classes according to the model/package-group classes generated by the class assembly model generator 1502. From the packages generated, a pseudo-code is created by the pseudo-code and naming generator 1504. Unit 1504 generates not only pseudo-code but names for each object, both of these reflecting the hierarchical rooted classification, the inheritance and the logical class assemblies all provided though units 1501, 1502 and 1503. Unit 1504 also generates names according to the inheritance-based naming method as described hereinabove. A memory or storage unit 1505 ensures the storage of all the generated class assemblies, pseudo-codes, names and objects. Finally, through memory 1505 or directly, the system 1506 communicates with client applications and/or users, represented by I/O 1507, exchanging for example any information pertaining to class assemblies, like their structures, object names and data.

Figure 16:
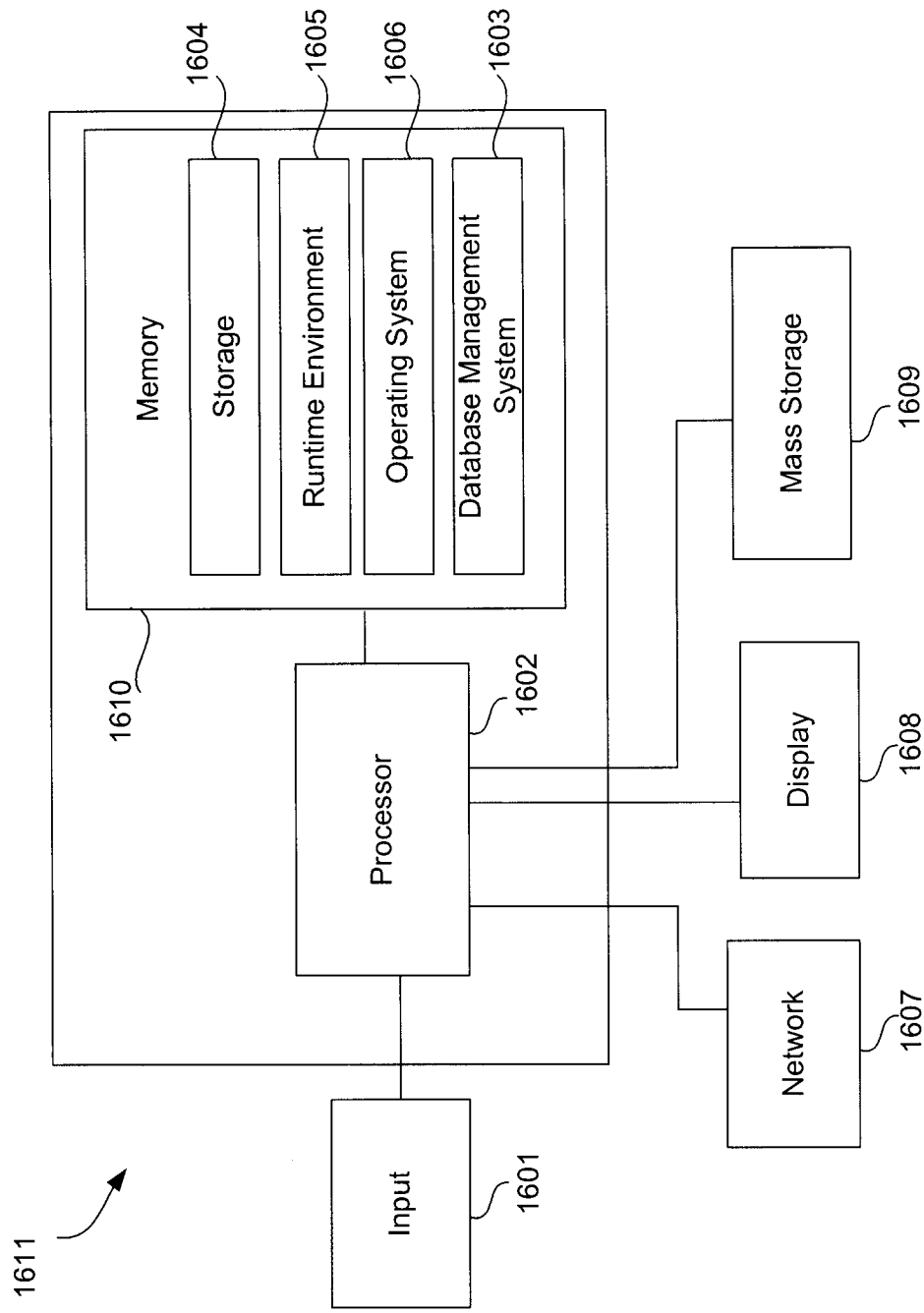
FIG. 16 is a block diagram of an example of a computer system suitable for implementing the present invention.

FIG. 16 illustrates a general computer system 1611 having exemplary software and hardware components consistent with the present invention. The computer system 1611 can be any other programmable electronic device, including a client computer, a server computer, a portable computer, a handheld computer, an embedded controller, etc. The computer system 1611, also referred to as an apparatus or a data-processing system, can be coupled in a network or may be a stand-alone device. The computer system 1611 typically has at least one processor 1602 coupled to a memory 1610. Processor 1602 can represent any processing unit(s): one or more processors, or microprocessors. Similarly, a memory unit may represent any memory devices such as memory 1610, the random access memory (RAM) devices including the main storage of the computer system, as well as any supplemental levels of memory (e.g., cache memories, non-volatile or backup memories, read-only memories, etc). In addition, the memory unit may be considered to include memory storage physically located elsewhere in computer system, like any cache memory located within a processor 1602, as well as any storage capacity used as a virtual memory, or as stored on a mass storage device 1609 or on another computer coupled to the computer system 1611, via a network 1608. Computer system 1611 also typically receives a number of inputs and outputs for communicating information externally. For interface with a user or operator, the computer system typically includes one or more user input devices 1601 (for example, a keyboard, a mouse, a trackball, a joystick, a touchpad, and/or a microphone), and a display 1608 (for example, a monitor or display panel, and/or a speaker). Additional storage such as mass storage devices 1609 can include any type of disk drives or direct access storage devices (DASD). Furthermore, an interface with one or more networks 1607 (such as a LAN, a WAN, a wireless network, and/or the Internet) permits the communication of information with other computers coupled to the network 1608. The computer system 1611 can also operate under the control of an operating system 1606, and executes or otherwise relies upon various computer software applications, components, programs, objects, modules, data structures, etc. (such as runtime environment 1605, storage 1604 and database management system 1603, among others). Moreover, various applications, components, programs, objects, modules, etc. may also execute on one or more processors in another computer coupled to computer system 1611 via a network 1607. This occurs, for example, in a distributed or client-server environment, wherein the processing required to implement the functions of a computer program may be allocated to multiple computers over a network.

The routines or steps executed to implement the embodiments of the invention, whether implemented as part of an operating system or a specific computer application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

It should be noted that the present invention can be carried out as a method, can be embodied in a system, a computer readable medium or an electrical or electromagnetic signal. Indeed, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

Furthermore, those skilled in the art will recognize that the exemplary environments illustrated in FIG. 15 and FIG. 16 are not intended to limit the present invention. Indeed, those skilled in the art will recognize that other alternative hardware and/or software environments may be used without departing from the scope of the invention.

Numerous fields of expertise can take advantage of the present invention. For example, the management of resources in corporations or institutions can be greatly facilitated by the method or system described herein. The ability to reflect reality and logic in the naming and organization of multiple objects or classes provides for enhanced retrieval, processing and/or management of any type of data. Easier maintenance of consistency within the overall architectures having multiples packages, interfaces and databases becomes possible, along with obtaining dynamic views of an application by associating different classes together. For example, in a large institution, various roles for employees can be grouped together in a certain manner, reflecting their hierarchy and their respective function at a certain time. Commercial entities along with their products and services, the registration of clients and suppliers, with their transactions can also be managed effectively. Transactions between senders and receivers, or sellers and buyers can be better retrieved, monitored and accomplished. Other applications involve creating coherent libraries of various elements such as names, objects, databases, etc., in order to create an entire system with a more efficient organization.

Other more specific applications include products that focus on Enterprise Resource Planning (ERP), advanced planning and optimizing solutions, Business Information Warehousing (BW), Costumer Relationship Management (CRM), Supply Chain Management (SCM), Supplier Relationship Management (SRM), Human Resource Management Systems (HRMS), Product Lifecycle Management (PLM), Exchange Infrastructure (XI), Enterprise Portal (EP), and Knowledge Warehouse (KW). As an example relating to ERP, the invention permits the integration of all data and processes of an organization into a single unified system, wherein a single, unified and structured database is used to store all the data of the various system modules.

Hence, all the basic functions of an organization, regardless of the organization's business or charter are integrated and controlled by the system. Business, non-profit organizations, non governmental organizations, governments, and other large entities benefit from ERP systems. The present invention can be used as a software package that provides both payroll and accounting functions, for example. The benefits of the present invention is not limited to, but can range from standardization and lower maintenance to easier and/or greater reporting capabilities as all data is typically kept in one database and is structured more effectively.

The embodiments of the invention described above are intended to be exemplary only. The scope of the invention is therefore intended to be limited solely by the scope of the appended claims.

What is claimed is:

1. A method for modeling classes to create an application in an object-oriented programming environment based on a hierarchical rooted classification (E) tree and inheritance-based naming of an entity, said method comprising:
in a logic classification (EB), on a first level of the logic classification, determining whether said entity belongs to a single-element class (EBU) or a multiple-element class (EBG) and providing a first indication therefor;
on a second level of the logic classification, said second level being below the first level:
  if said entity belongs to a single-element class (EBU), determining whether said entity is one of a data (EBUI), a link (EBUL), a role (EBUR) and a domain (EBUD), the data comprising a file, a database or an interface, the link comprising a link for a role, a link for an inheritance or a link for a group, the role comprising an activity, the domain comprising a virtual, a logical or a physical entity, and providing a second indication therefor; and
  if said entity represents a multiple-element class (EBG), determining whether said multiple-element class is one of:
    a family group (f) in which all elements are implemented objects from classes descendant from a same class;
    an inheritance group (h) in which all elements are implemented objects from a same class; an associative group (a), in which elements belong to different classes; and
    a package group (p) in which elements are part of a logical class assembly;
and providing a fourth indication therefor; and
creating a name for said entity by aggregating said first and said second indications or said first and said fourth indications, the indications appearing in the name in an order where an indication of a higher level appears before an indication of a lower level hence conveying inheritance in the hierarchical rooted classification tree;
wherein the classes in the hierarchical rooted classification (E) tree is a single unified structure.

2. The method as in claim 1, further comprising:
on a third level of the logic classification, said third level being below the second level, if said entity is a domain, determining whether said domain represents a virtual, logical or a physical entity, and providing a third indication therefor and wherein said name comprises said third indication.

3. The method as in claim 1, further comprising:
on a third level of the logic classification, said third level being below the second level, if said entity is a data, determining whether said data represents a file, a database or an interface and providing a third indication therefor and wherein said name comprises said third indication.

4. The method as in claim 1, further comprising:
on a third level of the logic classification, said third level being below the second level, if said entity is a link, determining whether said entity represents a link for a role, an inheritance or a group, and providing a third indication therefor and wherein said name comprises said third indication.

5. The method as in claim 1, further comprising:
on a third level of the logic classification, said third level being below the second level, if said entity is a role, determining whether said entity represents an activity, and providing a third indication therefor and wherein said name comprises said third indication.

6. The method as claimed in claim 1, further comprising generating a model classification (EM) and the logic classification (EB) within the hierarchical rooted classification tree.

7. The method as in claim 6, further comprising, within the model classification (EM) hierarchy, determining that a model/package-group class (EM-GpEB) represents a logical class assembly model, built around logic classification class (EB), and used in implementing a package-group class (EBGp) within said logic classification.

8. The method as in claim 7, further comprising determining that the logical class assembly model comprises at least one of the concepts of role, group and transaction.

9. The method as claimed in claim 8, further comprising representing a behavior for any given class of the classifications by the logical class assembly model built around the given class.

10. The method as in claim 7, further comprising using hierarchical classes in class assembly models.

11. The method as in claim 7, further comprising allowing hierarchical child model/package-group class to inherit class assembly model from the class assembly model of the parent class.

12. The method as in claim 1, further comprising allowing for inheritance-based naming of an entity according to its place within the hierarchical classification tree, as well as with respect to other referenced classes.

13. The method as in claim 12, further comprising using one-letter abbreviations to represent upper-level classes, use of two-letter abbreviations for intermediate-level classes, use of three-letter abbreviations for final classes and using the underscore character "_" in order to indicate class references.

14. The method as in claim 12, further comprising uniquely naming computer entities such as data, state, function and interface for the whole system.

15. A method for creating pseudo-code to create an application in an object-oriented programming environment based on a hierarchical rooted classification (E) tree and inheritance-based naming of an entity, the method comprising:
creating classes by performing the following steps:
in a logic classification (EB), on a first level of the logic classification, determining whether said entity belongs to a single-element class (EBU) or a multiple-element class (EBG) and providing a first indication therefor;
on a second level of the logic classification, said second level being below the first level:
if said entity belongs to a single-element class (EBU), determining whether said entity is one of a data (EBUI), a link (EBUL), a role (EBUR) and a domain (EBUD), the data comprising a file, a database or an interface, the link comprising a link for a role, a link for an inheritance or a link for a group, the role comprising an activity, the domain comprising a virtual, a logical or a physical entity, and providing a second indication therefor; and
if said entity represents a multiple-element class (EBG), determining whether said multiple-element class is one of:
a family group (f) in which all elements are implemented objects from classes descendant from a same class;
an inheritance group (h) in which all elements are implemented objects from a same class; an associative group (a), in which elements belong to different classes; and
a package group (p) in which elements are part of a logical class assembly;
and providing a fourth indication therefor; and
creating a name for said entity by aggregating said first and said second indications or said first and said fourth indications, the indications appearing in the name in an order where an indication of a higher level appears before an indication of a lower level hence conveying inheritance in the hierarchical rooted classification tree;
wherein the classes in the hierarchical rooted classification (E) tree is a single unified structure;
creating a class assembly model for each model/package-group class;
assembling said classes into package-group classes according to said model/package-group classes; and
using said classes for creating pseudo-code from said classes.

16. A computer implemented method for creating an application from model classes, said application for use in an object-oriented programming environment and based on a hierarchical rooted classification (E) tree and inheritance-based naming of an entity, said method comprising:
in a logic classification (EB), on a first level of the logic classification, determining whether said entity belongs to a single-element class (EBU) or a multiple-element class (EBG) and providing a first indication therefor;
on a second level of the logic classification, said second level being below the first level:
if said entity belongs to a single-element class (EBU), determining whether said entity is one of a data (EBUI), a link (EBUL), a role (EBUR) and a domain (EBUD), the data comprising a file, a database or an interface, the link comprising a link for a role, a link for an inheritance or a link for a group, the role comprising an activity, the domain comprising a virtual, a logical or a physical entity, and providing a second indication therefor; and
if said entity represents a multiple-element class (EBG), determining whether said multiple-element class is one of:
a family group (f) in which all elements are implemented objects from classes descendant from a same class;
an inheritance group (h) in which all elements are implemented objects from a same class; an associative group (a), in which elements belong to different classes; and
a package group (p) in which elements are part of a logical class assembly;
and providing a fourth indication therefor; and
creating a name for said entity by aggregating said first and said second indications or said first and said fourth indications; and
using said name and said classes to create said application for execution by a data-processing system, the indications appearing in the name in an order where an indication of a higher level appears before an indication of a lower level hence conveying inheritance in the hierarchical rooted classification tree;
wherein the classes in the hierarchical rooted classification (E) tree is a single unified structure.

17. The method as in claim 16, further comprising:
on a third level of the logic classification, said third level being below the second level, if said entity is a domain, determining whether said domain represents a virtual, logical or a physical entity, and providing a third indication therefor and wherein said name comprises said third indication.

18. The method as in claim 16, further comprising:
on a third level of the logic classification, said third level being below the second level, if said entity is a data, determining whether said data represents a file, a database or an interface and providing a third indication therefor and wherein said name comprises said third indication.

19. The method as in claim 16, further comprising:
on a third level of the logic classification, said third level being below the second level, if said entity is a link, determining whether said entity represents a link for a role, an inheritance or a group, and providing a third indication therefor and wherein said name comprises said third indication.

20. The method as in claim 16, further comprising:
on a third level of the logic classification, said third level being below the second level, if said entity is a role, determining whether said entity represents an activity, and providing a third indication therefor and wherein said name comprises said third indication.

21. The method as in claim 16, further comprising generating a model classification (EM) and the logic classification (EB) within the hierarchical rooted classification tree.

22. The method as in claim 21, further comprising, within the model classification (EM) hierarchy, determining that a model/package-group class (EM_GpEB) represents a logical class assembly model, built around logic classification class (EB), and used in implementing a package-group class (EBGp) within said logic classification.

23. The method as in claim 22, further comprising determining that the logical class assembly model comprises at least one of the concepts of role, group and transaction.

24. The method as claimed in claim 23, further comprising representing a behavior for any given class of the classifications by the logical class assembly model built around the given class.

25. The method as in claim 22, further comprising using hierarchical classes in class assembly models.

26. The method as in claim 22, further comprising allowing hierarchical child model/package-group class to inherit class assembly model from the class assembly model of the parent class.

27. The method as claimed in claim 16, further comprising allowing for inheritance-based naming of an entity according to its place within the hierarchical classification tree, as well as with respect to other referenced classes.

28. The method as in claim 27, further comprising using one-letter abbreviations to represent upper-level classes, use of two-letter abbreviations for intermediate-level classes, use of three-letter abbreviations for final classes and using the underscore character "_" in order to indicate class references.

29. The method as in claim 27, further comprising uniquely naming computer entities such as data, state, function and interface for the whole system.

30. The method as in claim 22, further comprising using said classes for creating pseudo-code, said pseudo-code creation comprising:
   creating a class assembly model for each model/package-group class;
   assembling said classes into package-group classes according to said model/package-group classes.

31. A data-processing system for creating an application in an object-oriented programming environment based on a hierarchical rooted classification (E) tree, the system comprising:
   a processor;
   a memory unit for communication with said processor, said memory unit comprising a program, said program for adapting said computer system to perform the following steps:
   in a logic classification (EB), on a first level of the logic classification, determining whether said entity belongs to a single-element class (EBU) or a multiple-element class (EBG) and providing a first indication therefor;
   on a second level of the logic classification, said second level being below the first level:
   if said entity belongs to a single-element class (EBU), determining whether said entity is one of a data (EBUI), a link (EBUL), a role (EBUR) and a domain (EBUD), the data comprising a file, a database or an interface, the link comprising a link for a role, a link for an inheritance or a link for a group,
   the role comprising an activity, the domain comprising a virtual, a logical or a physical entity, and providing a second indication therefor; and
   if said entity represents a multiple-element class (EBG), determining whether said multiple-element class is one of:
   a family group (f) in which all elements are implemented objects from classes descendant from a same class;
   an inheritance group (h) in which all elements are implemented objects from a same class; an associative group (a), in which elements belong to different classes; and
   a package group (p) in which elements are part of a logical class assembly;
   and providing a fourth indication therefor; and
   creating a name for said entity by aggregating said first and said second indications or said first and said fourth indications, the indications appearing in the name in an order where an indication of a higher level appears before an indication of a lower level hence conveying inheritance in the hierarchical rooted classification tree;
   using said name and said classes to create said application; and
   storing said application in said memory unit for execution by said processor;
   wherein the classes in the hierarchical rooted classification (E) tree is a single unified structure.

32. The computer system as in claim 31, further wherein said program is for adapting said computer system to generate a model classification (EM) and the logic classification (EB) within the hierarchical rooted classification tree.

33. The computer system as in claim 32, further wherein said program is for adapting said computer system to determine, within the model classification (EM) hierarchy, that a model/package-group class (EM-GpEB) represents a logical class assembly model built around logic classification class (EB), and used in implementing a package-group class (EBGp) within said logic classification.

34. The computer system as in claim 33, further wherein said program is for adapting said computer system to:
   create a class assembly model for each model/package-group class;
   assemble said classes into package-group classes according to said model/package-group classes; and
   using said classes to create pseudo-code.

35. A non-transitory computer readable medium having recorded thereon statements and instructions for execution by a data-processing system to carry out a computer-implemented method for creating an application from model classes, in an object-oriented programming environment based on a hierarchical rooted classification (E) tree, said method comprising:
   in a logic classification (EB), on a first level of the logic classification, determining whether said entity belongs to a single-element class (EBU) or a multiple-element class (EBG) and providing a first indication therefor;
   on a second level of the logic classification, said second level being below the first level:
   if said entity belongs to a single-element class (EBU), determining whether said entity is one of a data (EBUI), a link (EBUL), a role (EBUR) and a domain (EBUD), the data comprising a file, a database or an interface, the link comprising a link for a role, a link for an inheritance or a link for a group, the role comprising an activity, the domain comprising a virtual, a logical or a physical entity, and providing a second indication therefor; and
   if said entity represents a multiple-element class (EBG), determining whether said multiple-element class is one of:
   a family group (f) in which all elements are implemented objects from classes descendant from a same class;

an inheritance group (h) in which all elements are implemented objects from a same class; an associative group (a), in which elements belong to different classes; and a package group (p) in which elements are part of a logical class assembly;

and providing a fourth indication therefor; and creating a name for said entity by aggregating said first and said second indications or said first and said fourth indications, the indications appearing in the name in an order where an indication of a higher level appears before an indication of a lower level hence conveying inheritance in the hierarchical rooted classification; and using said name and said classes to create said application;

wherein the classes in the hierarchical rooted classification (E) tree is a single unified structure.

36. The method as in claim 1, wherein providing a first indication comprises providing a predetermined first indication and providing a second indication comprises providing a predetermined second indication, whereby creating a name for said entity comprises creating a predetermined name for said entity.

\* \* \* \* \*